UNITED STATES PATENT OFFICE.

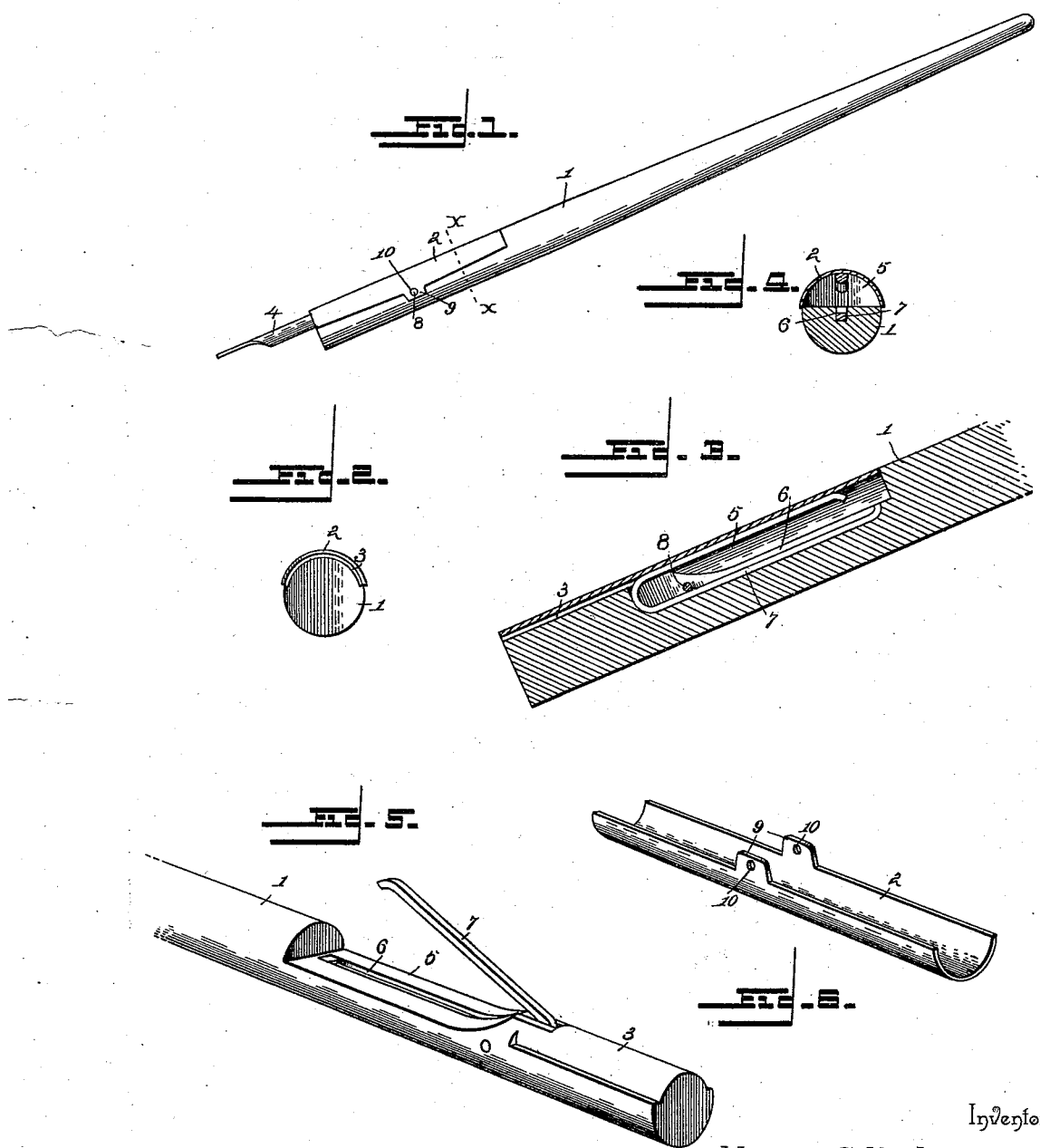

HENRY CLAY HYDE, OF KINGWOOD, WEST VIRGINIA.

PENHOLDER.

SPECIFICATION forming part of Letters Patent No. 547,551, dated October 8, 1895.

Application filed August 21, 1895. Serial No. 560,027. (No model.)

*To all whom it may concern:*

Be it known that I, HENRY CLAY HYDE, a citizen of the United States, residing at Kingwood, in the county of Preston and State of West Virginia, have invented a new and useful Penholder, of which the following is a specification.

This invention relates to penholders, and most especially to the means for securing the pen-point thereto; and the object of the improvement is to simplify and cheapen that class of penholders which embody in their organization a handle and a lever, the latter being fulcrumed to the handle between its ends and acted upon by means of a spring or other contrivance, so as to secure or grip the pen-point between the handle and the forward end of the said lever.

The improvement consists of the novel construction and combination of parts, which hereinafter will be more fully set forth and claimed, and which are illustrated in the accompanying drawings, in which—

Figure 1 is a side elevation of a penholder constructed in accordance with this invention. Fig. 2 is an end view thereof, the pen-point being removed. Fig. 3 is a longitudinal section. Fig. 4 is a transverse section on the line X X of Fig. 1, looking to the right. Fig. 5 is a detail view of the lower end of the handle, the lever being detached. Fig. 6 is a detail view of the lever.

Like numerals of reference designate corresponding parts in all the figures of the drawings.

The penholder comprises, essentially, a handle 1 and a lever 2, the handle being of usual form and constructed of material such as is generally employed in the manufacture of penholders; but for economy of manufacture the said handle will be formed of wood, and its lower end is reduced on one side for a short distance, so as to form a seat 3 for the pen-point 4. A depression 5 is formed in the handle immediately in the rear of the seat 3 to admit of the inner end of the lever 2 being depressed when it is required to adjust or release the pen-point. A longitudinal groove 6 is provided in the depressed portion 5 of the handle and receives one member of an approximately V-shaped spring 7, by means of which the inner end of the lever 2 is pressed upwardly and its front end caused to grip the pen-point between it and the seat 3. This V-shaped spring 7 is placed with its apex facing the lower end of the handle and is retained in place in the groove 6 by frictional engagement with the walls of the said groove and by means of the pivot 8, which latter passes through the angle formed between the diverging members of the said spring.

The lever 2 is formed of sheet metal and is curved between its edges to conform to the outline of the handle in cross-section and is provided at its longitudinal edges and midway of its ends with ears 9, which have transversely-aligning openings 10 for the passage of the pivot 8, by means of which the said lever has pivotal connection with the handle 1. This lever is placed opposite to the seat 3 and the depression 5 and forms a housing therefor and secures a neat appearance of the holder. The inner end of the lever 2 corresponds with the shouldered end of the depression 5, so as to be pressed into the said depression when it is required to place a pen-point in position or release the latter. It will be observed that the lever 2 is placed exterior to the handle and can be economically manufactured by being struck up from sheet metal, and the curving thereof between its edges lends strength to the lever and admits of it being formed from comparatively thin sheet metal, thereby providing a holder which is both light and neat in appearance. The construction admits of either end of the pen-point being clamped between the seat 3 and the opposing end of the lever, thereby making provision for carrying the instrument in the pocket without injury to the writing-point of the pen or to the clothing, as will be readily appreciated. When it is required to release a pen-point, the inner end of the lever 2 is pressed upon, which results in a corresponding outward movement of the front or lower end of the lever, and by giving the holder a smart flirt or turning it into a vertical position the pen-point will be dislodged without requiring the grasping of the same to attain this end, thereby obviating soiling of the fingers by coming in contact with the ink on the said pen-point after the latter has been in ink. The component parts are readily accessible and can be quickly assembled, thereby admitting of the holder being constructed commercially and placed upon the market at a comparatively low cost considering the resultant advantages possessed thereby.

What is claimed is—

As an improved article of manufacture, the herein shown and described pen holder, comprising a handle having its lower end reduced to form a seat for the pen point, and having a depression in the rear of the said seat, and having a longitudinal groove in the said depressed portion, an approximately V-shaped spring arranged with its apex facing the lower end of the handle and having one member fitted in the said longitudinal groove, a lever curved between its edges to conform to the outline of the handle and placed opposite to the said seat and depression, and having ears at its edges and midway of its ends, and a pivot passing through openings in the said ears and through the angle formed between the diverging members of the said spring and pivotally connecting the said lever with the handle, the parts being so disposed that the inner end of the lever can be pressed into the aforementioned depression, substantially as described, for the purpose set forth.

In testimony that I claim the foregoing as my own I have hereto affixed my signature in the presence of two witnesses.

HENRY CLAY HYDE.

Witnesses:
GEO. N. MCDONALD,
J. W. WATSON.